US012769403B2

(12) United States Patent
Inoue

(10) Patent No.: US 12,769,403 B2
(45) Date of Patent: Oct. 20, 2026

(54) SYSTEM, METHOD, AND PROGRAM FOR REALIZING USER INTERFACE BASED ON FINGER IDENTIFICATION

(71) Applicant: Metamatiks PTE. LTD., Singapore (SG)

(72) Inventor: Yohei Inoue, Sentosa Island (SG)

(73) Assignee: Metamatiks PTE. LTD., Singapore (SG)

( * ) Notice: Subject to any disclaimer, the term of this patent is extended or adjusted under 35 U.S.C. 154(b) by 0 days.

(21) Appl. No.: 18/730,482

(22) PCT Filed: Jan. 19, 2023

(86) PCT No.: PCT/JP2023/001599
§ 371 (c)(1),
(2) Date: Jul. 19, 2024

(87) PCT Pub. No.: WO2023/140340
PCT Pub. Date: Jul. 27, 2023

(65) Prior Publication Data

US 2025/0147594 A1 May 8, 2025

(30) Foreign Application Priority Data

Jan. 19, 2022 (JP) ................................ 2022-006752

(51) Int. Cl.
*G06F 3/04817* (2022.01)
*G06F 3/01* (2006.01)
(Continued)

(52) U.S. Cl.
CPC ............ *G06F 3/017* (2013.01); *G06F 3/0425* (2013.01); *G06F 3/04817* (2013.01);
(Continued)

(58) Field of Classification Search
CPC .... G06F 3/017; G06F 3/0425; G06F 3/04817; G06F 3/04886; G06F 2203/04101;
(Continued)

(56) References Cited

U.S. PATENT DOCUMENTS 10,180,714 B1 * 1/2019 Kin .................... G06F 3/04883
11,775,168 B1 * 10/2023 Vignau .............. G06F 3/04815
715/825
(Continued)

FOREIGN PATENT DOCUMENTS

JP 2011/180843 9/2011
JP 2012/527657 11/2012
(Continued)

OTHER PUBLICATIONS

Written Opinion of the International Searching Authority dated Apr. 11, 2023 issued in PCT/JP2023/001599.
(Continued)

*Primary Examiner* — Afroza Chowdhury
(74) *Attorney, Agent, or Firm* — COZEN O'CONNOR

(57) ABSTRACT

Provided are a system, method, and program for realizing an intuitive and efficient user interface based on the identification of each finger of a user. Actions are shown using instantly recognizable icons, labels, or both, and the user can recognize the function to be performed by displaying instantly recognizable icons, labels, or both on the fingertips of virtual hands representing fingers identified by a camera or other means. It allows many types of direct actions on an object of an action, with the number of types being more than the number of fingers by mode switching.

12 Claims, 11 Drawing Sheets

(51) Int. Cl.
*G06F 3/042* (2006.01)
*G06F 3/04886* (2022.01)
*G06V 40/20* (2022.01)

(52) U.S. Cl.
CPC .......... *G06F 3/04886* (2013.01); *G06V 40/28* (2022.01); *G06F 2203/04101* (2013.01); *G06F 2203/04104* (2013.01); *G06F 2203/04803* (2013.01); *G06F 2203/04808* (2013.01)

(58) Field of Classification Search
CPC . G06F 2203/04104; G06F 2203/04803; G06F 2203/04808; G06V 40/28
See application file for complete search history.

(56) References Cited

U.S. PATENT DOCUMENTS

| | | | | |
|---|---|---|---|---|
| 2008/0163131 | A1* | 7/2008 | Hirai | G06F 3/0425<br>715/863 |
| 2009/0309848 | A1* | 12/2009 | Terada | G06V 40/113<br>715/810 |
| 2011/0210928 | A1* | 9/2011 | Matsuda | G06F 3/04886<br>345/173 |
| 2012/0075229 | A1* | 3/2012 | Summers | G06F 3/04886<br>345/173 |
| 2015/0253887 | A1* | 9/2015 | Nishida | G06F 3/0488<br>345/173 |
| 2016/0048323 | A1 | 2/2016 | Laubach | |
| 2016/0291862 | A1* | 10/2016 | Yaron | B60K 35/10 |
| 2019/0346966 | A1* | 11/2019 | Wunderlich | G06F 3/0304 |

FOREIGN PATENT DOCUMENTS

| | | |
|---|---|---|
| JP | 2015-170102 | 9/2015 |
| WO | 2006/104132 | 10/2006 |
| WO | 2008/078603 | 7/2008 |
| WO | 2010/134615 | 11/2010 |
| WO | 2013/080425 | 6/2013 |

OTHER PUBLICATIONS

Extended European Search Report dated Mar. 28, 2025, European Application No. 23743332.

* cited by examiner

SYSTEM, METHOD, AND PROGRAM FOR REALIZING USER INTERFACE BASED ON FINGER IDENTIFICATION

RELATED APPLICATIONS

This is a U.S. National Phase Application under 35 USC 371 of International Application PCT/JP2023/001599 filed on Jan. 19, 2023.

This application claims the priority of Japanese application no. JP 2022-006752 filed Jan. 19, 2022, the entire content of which is hereby incorporated by reference.

FIELD OF THE INVENTION

The present invention relates to a system, method and program for realizing a user interface based on finger identification.

BACKGROUND ART

Various techniques have been proposed for user interfaces that allow users to interact with computers. One of these techniques is realized by identifying each finger of the user's hand and assigning a function to each.

The basic example of such a technique is to assign a different function to each finger. If fixed functions are assigned, only 10 functions can be assigned for 10 fingers. Since 10 functions are not sufficient for many applications, it is necessary to appropriately switch the pairs of functions to be assigned. In order to use the assigned functions smoothly, it is important to make the correspondence between functions and fingers easily understandable.

Patent document 1 describes a technology that associates a TV function to a finger. When said finger is in contact with the touchscreen 2, the technology associates a cancel function or a setting function of the TV function to another finger (FIG. 21, etc.).

PRIOR ART

Patent Documents

Patent document 1: International Publication No. 2006/104132.

SUMMARY OF THE INVENTION

Further improvements can be made in the user interface that identifies the user's fingers and assigns functions to multiple identified fingers.

The present invention was made in view of the above, and its problem is to realize a more intuitive and efficient user interface based on the identification of each finger of the user in a system, method or program for providing a user interface to a user.

Solution to the Problem

The first aspect of the present invention is a method for providing a user interface to a user, comprising steps of: identifying a plurality of fingers of the user; assigning a mode switching function to a first finger of the identified plurality of fingers; and switching each of functions assigned to second and third fingers of the plurality of fingers to another function in response to a touch action by the first finger; wherein at least one of the second finger and the third finger is different from the first finger.

Also, the second aspect of the present invention is the method according to the first aspect, wherein the touch action is a touch action on an object.

Also, the third aspect of the present invention is the method according to the second aspect, wherein said another function is one of a mode switching function, a parameter control function and an object selection function.

Also, the fourth aspect of the present invention is the method according to the second aspect, wherein a function assigned to the second finger after switching is a parameter control function, and a function assigned to the third finger after switching is a function to change the parameter control function.

Also, the fifth aspect of the present invention is the method according to the second aspect, wherein a function assigned to the second finger after switching is a parameter control function, the method further comprising a step of assigning a function to change the parameter control function to a finger different from the second finger of the plurality of fingers in response to a touch action by the second finger.

Also, the sixth aspect of the present invention is the method according to the second aspect, wherein a function assigned to the second finger after switching is a command processing function.

Also, the seventh aspect of the present invention is the method according to the sixth aspect, wherein the command processing function is one of an editing function, a conversion function, a search function, a save function, a copy function, a computation function, a transmission function, and any combination of these functions.

Also, the eighth aspect of the present invention is the method of any of the first to fourth aspects, wherein the second finger is the same finger as the first finger.

Also, the ninth aspect of the present invention is the method of any of the first to ninth aspects, further comprising a step of returning the functions of the second finger and the third finger to pre-switching functions when the touch action of the first finger is released.

Also, the tenth aspect of the present invention is the method of any of the first to eighth aspects, further comprising a step of returning the functions of the second finger and the third finger to pre-switching functions when the touch action of the first finger is released within a predetermined time.

Also, the eleventh aspect of the present invention is the method of any of the second to eighth aspects, wherein the selection state of the object is maintained even after the touch action is released.

Also, the twelfth aspect of the present invention is the method according to the eleventh aspect, further comprising a step of switching each of the functions assigned to the second finger and the third finger to a function different from functions before and during the touch action in response to the release of the touch action.

Also, the thirteenth aspect of the present invention is the method according to the eleventh or twelfth aspect, further comprising steps of terminating the selection state in response to a touch action by one of the plurality of fingers; and switching each of the functions assigned to the second finger and the third finger to its pre-switching function in response to the termination of the selection state.

Also, a fourteenth aspect of the present invention is the method of any of the first to thirteenth aspects, wherein a virtual hand representing the plurality of identified fingers is displayed on a display used by the user, together with an icon or label representing functions assigned to each finger.

Also, the fifteenth aspect of the present invention is the method according to the fourteenth aspect, wherein the label is displayed only when a finger associated with the label is positioned at or above a predetermined height from the desk used by the user.

Also, the sixteenth aspect of the present invention is the method according to the fourteenth aspect, wherein when the user's finger is outside an area of a screen of the display, the icon or the label is displayed at an edge of the screen.

Also, the seventeenth aspect of the present invention is the method of any of the first through sixteenth aspects, wherein the plurality of fingers of the user includes one of fingers of the right hand of the user and one of finger of the left hand of the user.

Also, the eighteenth aspect of the present invention is the method of any of the first to seventeenth aspects, wherein at least one of the first finger, the second finger, and the third finger is a set of fingers including a plurality of fingers.

Also, the nineteenth aspect of the present invention is a program for causing a computer to perform a method of providing a user interface to a user, the method comprising steps of: identifying a plurality of fingers of the user; assigning a mode switching function to a first finger of the identified plurality of fingers; and switching each of functions assigned to second and third fingers of the plurality of fingers to another function in response to a touch action by the first finger; wherein at least one of the second finger and the third finger is different from the first finger.

Also, the twentieth aspect of the present invention is an apparatus for providing a user interface with an application to a user, configured to: identify a plurality of fingers of the user; assign a mode switching function to a first finger of the identified plurality of fingers; and switch each of functions assigned to second and third fingers of the plurality of fingers to another function in response to a touch action by the first finger; wherein at least one of the second finger and the third finger is different from the first finger.

According to one aspect of the present invention, an intuitive and efficient user interface can be realized based on the identification of each finger of the user.

DETAILED DESCRIPTION OF THE EMBODIMENTS

Embodiments of the present invention is explained with reference to the figures. All figures are illustrative. The present specification discloses a system, method, and program regarding an interaction with a computer realized by identifying multiple fingers of a user and performing multiple touch actions using the identified fingers (hereinafter also referred to as "finger-identification multi-touch interaction").

Figure 1:
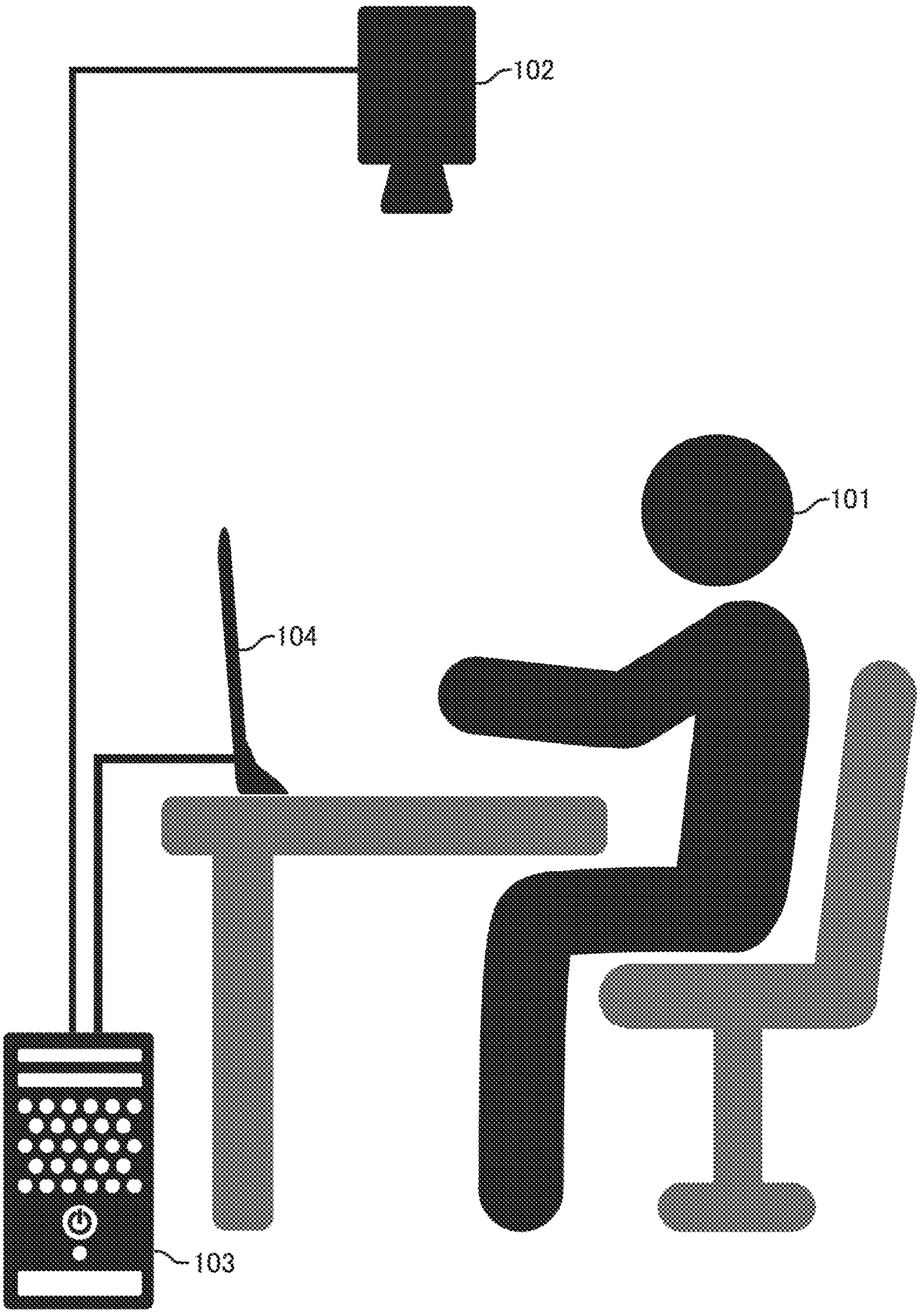
FIG. 1 shows the overall configuration of the system that realizes finger identification multi-touch interaction according to an embodiment of the present invention.

FIG. 1 shows the overall configuration of a system for realizing finger identification multi-touch interaction according to an embodiment of the present invention. The user interface to an application is realized by capturing images of one or both hands of the user (101) with a camera (102) installed above the head or the like, and recognizing the position of each finger through the processing by a control program (described below) running on a computer (103). Recognition of finger positions should be performed not only in the horizontal direction but also in the vertical direction. To make the recognition of the vertical position of a finger (especially the tap action described below) easier for the user (101) to understand, it is preferable that the finger operation is performed on a horizontal surface such as a desk. Although user interface with an application is described below as the primary example, the present invention is also applicable to user interface with an OS or middleware, and specifically, a "screen" referred to below is not limited to a screen displayed by an application, but also includes a screen displayed by an OS or middleware.

As a guide to the user (101), a schematic user hand (hereinafter also referred to as "virtual hand") is preferably displayed on a display (104). It is preferable that the virtual hand and the application screen are superimposed on the display (104) so that the user can directly perform actions such as shape editing on the application screen. To improve the accuracy of the image recognition process of the hands by the camera (102), a sheet of a single color may be placed under both hands of the user (101). Black is preferred for said color. A tactile feedback (haptics) device (not shown) may be placed on the desk to provide feedback to touch or other actions by the user. An apparatus may be provided to provide feedback of user input by sound, light, or other means. The display (104) and the surface for actions may be integrated into a single structure.

The camera (102) is preferably a camera equipped with a depth sensor to increase the accuracy of finger position recognition. It preferable that it captures color images to increase the accuracy of finger recognition. An input of the user (101) is preferably performed not only with one hand but also with both hands. Recognition of the user's (101) finger operation may be realized by any recognition method, such as a conventional touch screen, touch pad, smart glove with built-in sensors or a combination of these instead of capturing by the camera (102). The functionality of the computer (103) may be realized by an external server, such as a cloud. The computer (103) may be equipped with other input devices (mouse, keyboard, etc.) for auxiliary use, but not shown.

Figure 2:
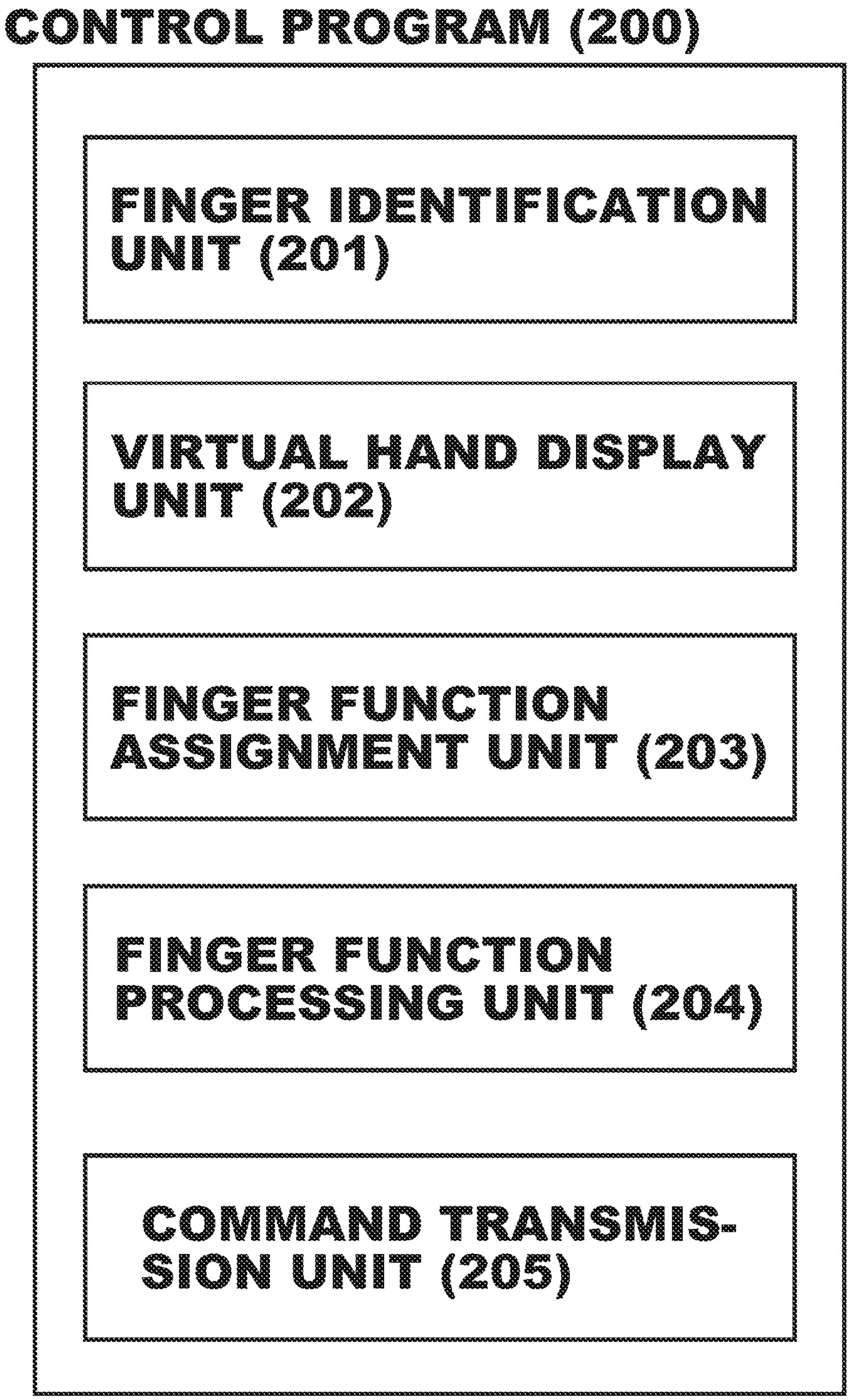
FIG. 2 shows an example of a computer program for realizing a finger identification multi-touch interaction according to an embodiment of the present invention.

FIG. 2 shows an example of a control program for realizing a finger identification multi-touch interaction according to an embodiment of the present invention. The finger recognition unit (201) is responsible for recognizing the position of each finger of the hand of the user (101) and converting it into coordinate data by performing contour extraction processing on the image captured by the camera (102). It is preferable to recognize the vertical position in addition to the horizontal position for the position. By recognizing the vertical position, the judgment process for a tap or hover action, as described below, may be performed. The virtual hand display unit (202) plays the role of displaying on the display (104) a virtual hand representing the state of each finger of the hand of the user (101) and associated icons or labels. The finger function assignment unit (203) assigns to each finger of the user (101) a function such as command processing, temporary mode switching, object selection, parameter control, etc. appropriate to the current situation. It also plays the role of changing the function assignment to a finger when a certain action is taken. The finger function processing unit (204) plays the role of performing the function assigned to a finger at that time when the user performs a touch action. The command transmission unit (205) plays the role of transmitting a command to an application to process the function assigned to the finger that performed the touch action. Here, a "command processing" means the processing identified by a command, and different commands are executed depending on the type of processing.

Here, a "touch action" is typically the action of lowering a floating finger to the surface of a desk, but it may also be a contact with an object other than a desk, such as a touch screen, touch pad, or other part of the body such as the thigh/other hand, etc. and may be realized in any way (these actions are also referred to as "touch actions"). A touch action may be performed simultaneously with multiple fingers as a set of fingers. In addition to a contact, the fact that a finger is pushed in with a pressure above a certain level may be detected as a touch action.

It is not necessary that each part of the control program (200) corresponds to a single program module. Some or all of the functions may be realized by linking the control program (200) with a program such as an application. Examples of such programs include a web browser, JavaScript (registered trademark) that can run on a web browser, a native program that can be linked with the JavaScript, etc. In addition, some or all of the functions may be performed on a peripheral device such as a camera, or on an external computer such as a cloud. It can also be stored on a computer-readable storage medium to form a non-transitory program product.

The finger identification multi-touch interaction according to an embodiment of the present invention may display icons or labels on the fingertips of the virtual hand representing fingers identified by a camera or other means to represent functions assigned to the fingers. This, together with the temporary mode switching described below, allows many types of direct actions more than the number of fingers to be performed on the object of the actions. It may also be possible to select functions in a hierarchical manner by switching the assignment of a group of functions by means of temporary mode switching. In addition, the mode can also be switched by selecting an object of an action to enable context-sensitive function selection.

Figure 3:
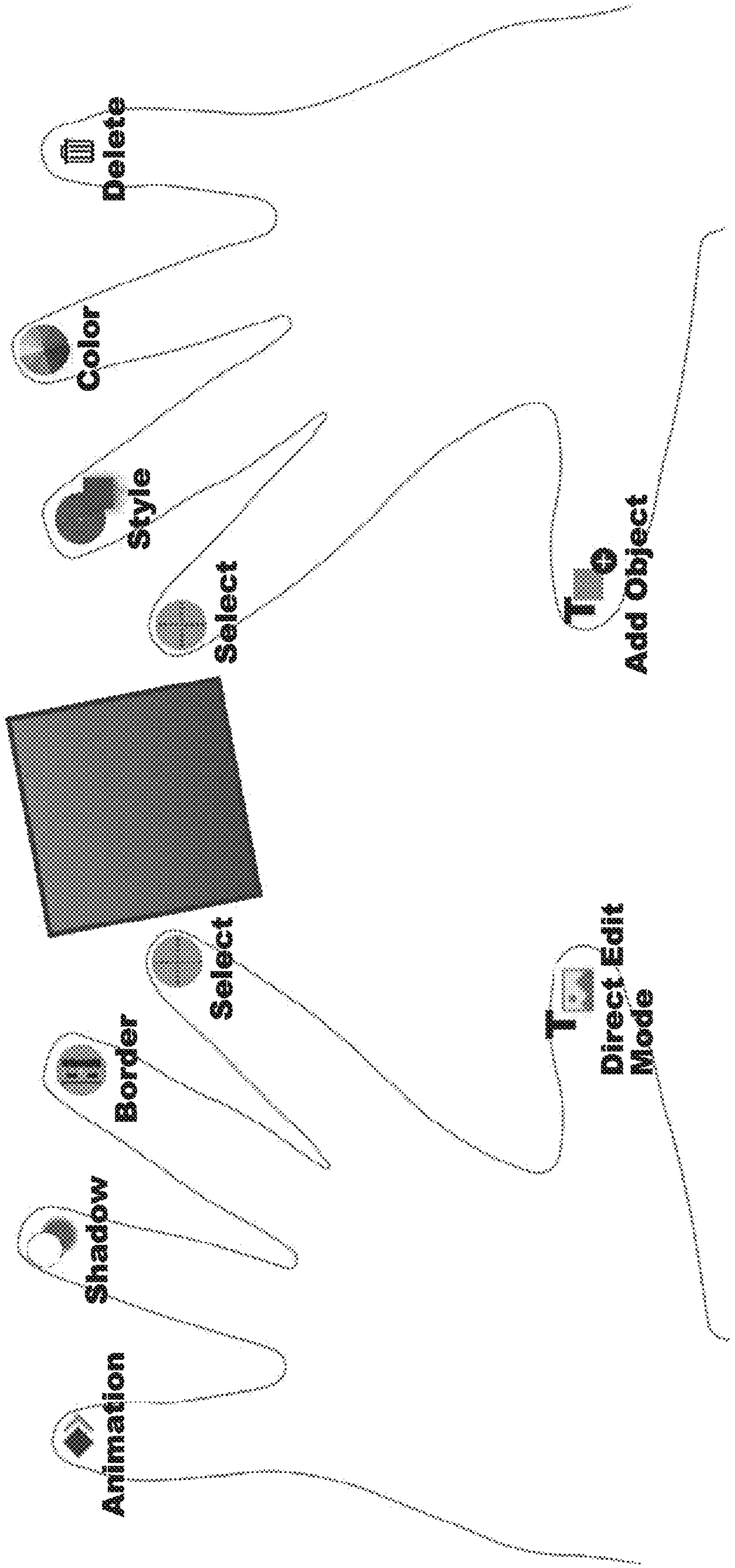
FIG. 3 shows the correspondence between fingers and functions in a slide creation application according to an embodiment of the present invention.

FIG. 3 shows an example of the correspondence between each finger and its function on the virtual hand in a slide creation application according to an embodiment of the present invention. The right thumb is assigned the function "Add Object" and the right index finger is assigned the function "Select." Functions may include command processing, temporary mode switching, selection of an object of an action, and parameter control. In the example in FIG. 3, the right index finger and left index finger are assigned the function of "selection of action object" while the right thumb and left thumb are assigned the function of "temporary mode switching." Specifically, the right hand thumb is assigned the function of "add object," and in response to the detection of a touch action by the right hand thumb, the mode is temporarily switched and a different set of functions is assigned to each finger. The function assignment to each finger may be performed by the finger function assignment unit (203) of the control program (200). As an example, when a user (101) performs a touch action with a certain finger, the finger function processing unit (204) processes the function that was assigned to the corresponding finger on the virtual hand at that time. If the function in question is command processing in an application, information on the command is transmitted to the application via the command transmission unit (205) of the control program (200), and the prescribed processing is performed.

Here, even if the fingertip is outside the screen area, if the fingertip is within the recognition range of the fingertip position recognition means such as the camera (102), it is preferable that the icon is displayed at the edge of the screen to allow the user to see and touch the screen. It is preferable that the vertical coordinate position, if it is the left or right screen edge, or the horizontal coordinate position, if it is the top or bottom screen edge, is moved in conjunction with the corresponding fingertip. This will seamlessly present an icon when the finger moves out of the screen or into the screen, and prevent the screen edge from being fixedly obscured by an icon. When the fingertip is the camera (102) or other fingertip position recognition means, it is preferable that the icon or label is hidden or changed in color or transparency to indicate to the user that the finger is out of recognition range.

The icons displayed with the virtual hand may be made larger to facilitate visual exploration. In the case of a conventional user interface such as a toolbar, if the icons are large, they will occupy a fixed amount of screen space, but in the finger identification multi-touch interaction according to the present embodiment, even if the icons are displayed relatively large, they can be moved simply by moving the hand, so the screen space is not occupied in a fixed manner. It is preferable to enable displaying larger icons for users with poor eyesight or beginners, and smaller icons for skilled users.

It is preferable to display a cursor on one or more fingertips to indicate that object selection is possible or to indicate a hotspot or area for selection. This is because in addition to the fingers for object selection, there are fingers for a command processing or mode switching and it is necessary to clarify which fingers are available for object selection. If it is not the finger for object selection, it is preferable to display a specific cursor to indicate so, or to display only an icon.

If the user is a novice, it is preferable to display both icons and labels because the user searches for functions by visual or direct exploration. However, in the finger-identification multi-touch interaction according to the present embodiment, since the selection can be made without seeing and there is no need to always present the labels, it is preferable for skilled users to hide the labels and display them only when fingers are positioned above a certain height from the desk, so that skilled users can check them immediately in case they forget.

Temporary Mode Switching

Figure 4A:
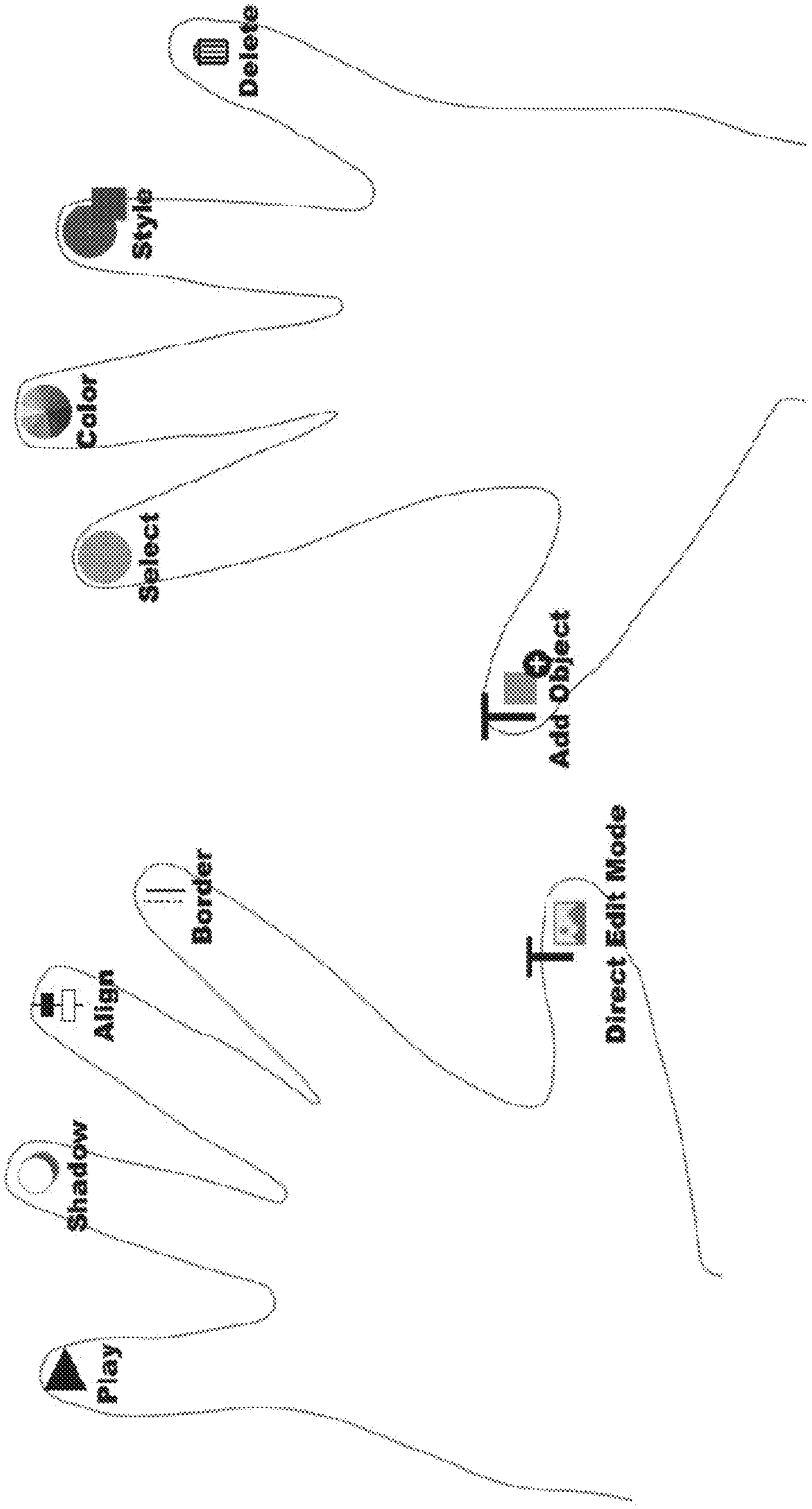
FIG. 4A shows the correspondence between fingers and functions before adding an object according to an embodiment of the present invention.
Figure 4B:
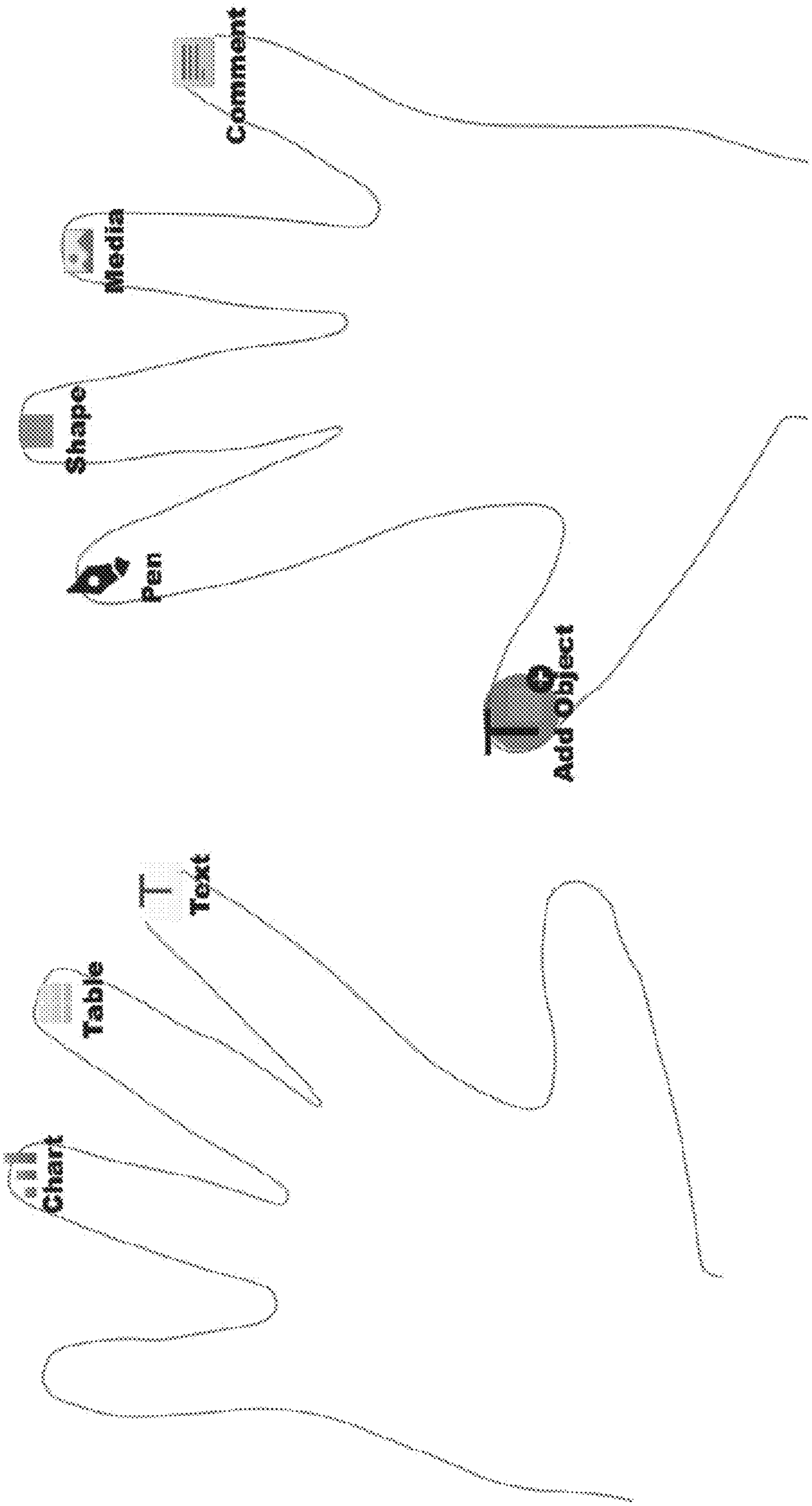
FIG. 4B shows the correspondence between fingers and functions when adding an object according to an embodiment of the present invention.

FIGS. 4A and 4B show examples of object addition in a figure editing application according to an embodiment of the present invention. When a touch action is performed with a specific finger (corresponding to a "first finger"), a new set of functions can be assigned to multiple fingers (corresponding to "second finger" and "third finger"). A new function may be assigned to the specific finger by which the touch action was performed. The specific finger may be a single finger, such as the index finger of the right hand, or a specific set of multiple fingers. The mode may be switched only while the touch action by the specific fingers is continued, and the mode may be restored when the touch action is released. FIG. 4A is the state in which no touch action is performed with the right thumb, and FIG. 4B is the state in which touch action is performed with and the right thumb. In this example, by performing a touch action with the right hand thumb to which the temporary mode switching function to the "Add object" mode is assigned, the function group assigned to the other fingers is switched and the object to be added can be determined. For example, if the touch action is performed with the left index finger while the touch action is maintained with the right thumb, the command processing function of adding a text is executed. When the right thumb touch action is released, the mode returns to the original state, as shown in FIG. 4A above. When an object is added, it may be controlled to add the object at the position of the dominant index finger. The index finger of the dominant hand is often assigned command processing functions to manipulate objects, such as intuitive movement for the user. Since movement after adding an object is a frequently performed pattern, the efficiency of the action can be improved.

In the basic process of temporary mode switching, when the touch action with the finger that activated the temporary mode is released, the mode is restored and the function group assignment to the fingers returns to the state before the switch. Alternatively, the mode may be permanently switched when the touch action is performed for a short period of time equal to or below a predetermined time (tap action), and returned to the pre-switching state in response to the release of the touch action when the touch action is performed for longer than or equal to the predetermined time (long press action). Although the functions assigned to multiple fingers are mainly described as being switched on a mode-by-mode basis, it is conceivable to control the return to the pre-switching state only for some of the multiple fingers, or not to return to the pre-switching state, when the predetermined conditions are met.

Temporary Mode Switching with Object Selection

Figure 5:
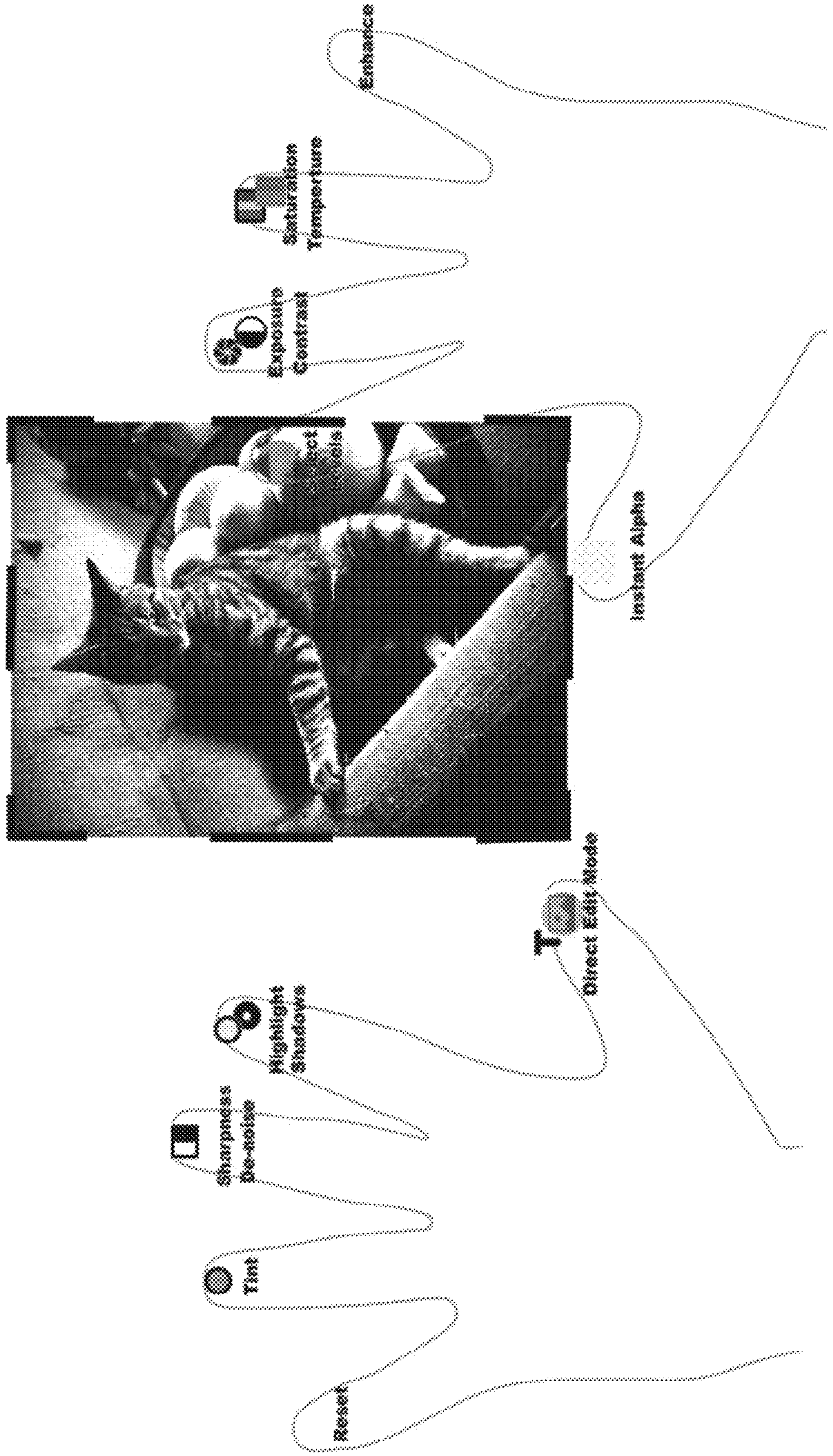
FIG. 5 shows the correspondence between fingers and functions during object editing according to an embodiment of the present invention.

FIG. 5 shows the correspondence between fingers and functions during object editing. In this example, touch action is performed by the left thumb to which the function of switching to Direct Edit Mode is assigned, and while it continues, the image editing command processing is assigned to the other fingers. For example, the image can be touched with the middle finger of the right hand, to which the Exposure Contrast command processing is assigned, to edit exposure and contrast. The advantage of this action is that the selection of the image to be edited and the execution of the command processing function can be performed in a single action. Here, when the touch action with the left thumb is released, the mode may be restored and perform a control to return the assignment of the function group to the fingers to the pre-switching state of FIG. 4A, or the mode may be restored only under predetermined conditions as in the previous paragraph.

Figure 6A:
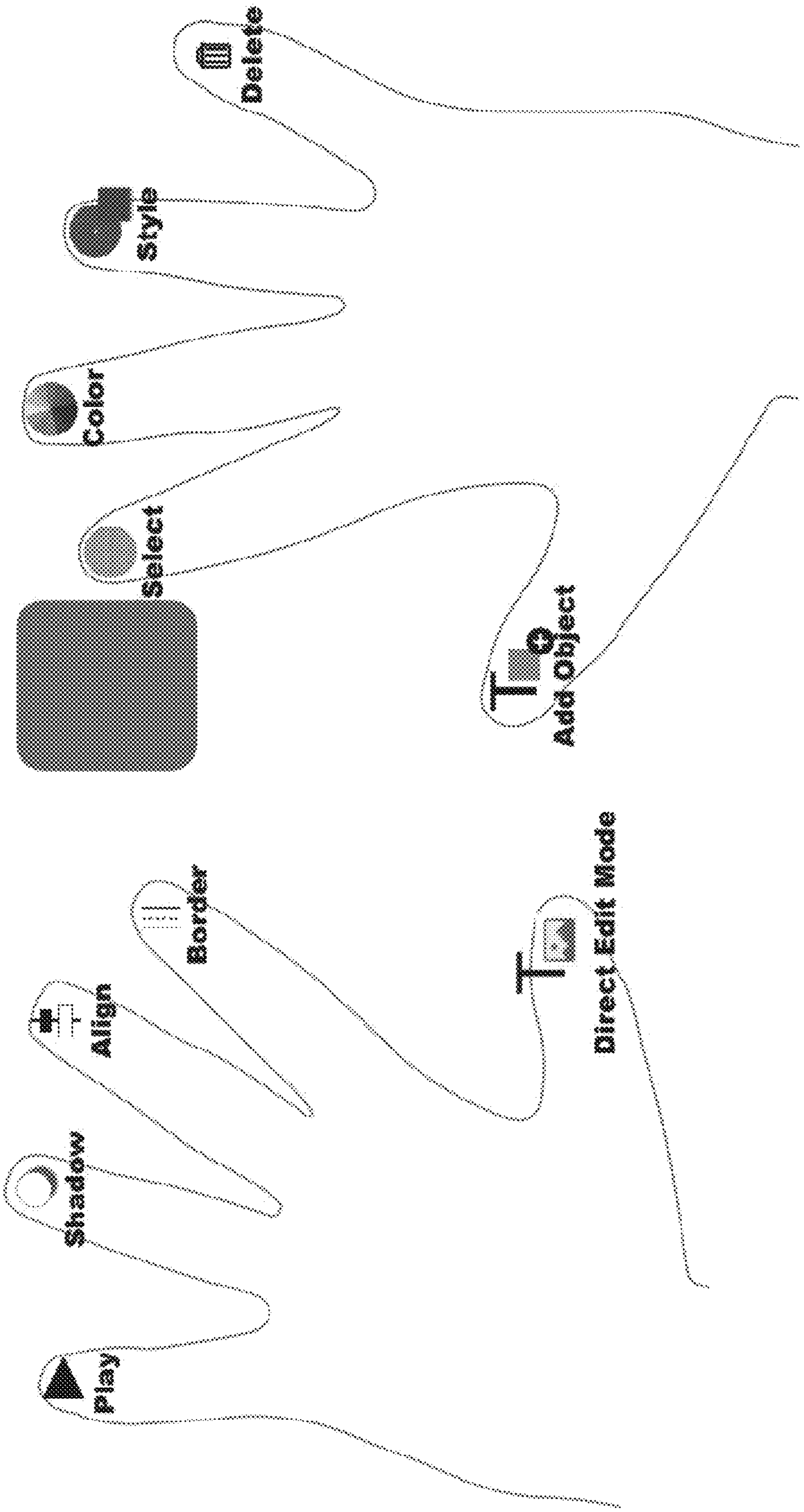
FIG. 6A shows the correspondence between the finger and the function before the selection of a figure according to an embodiment of the present invention.
Figure 6B:
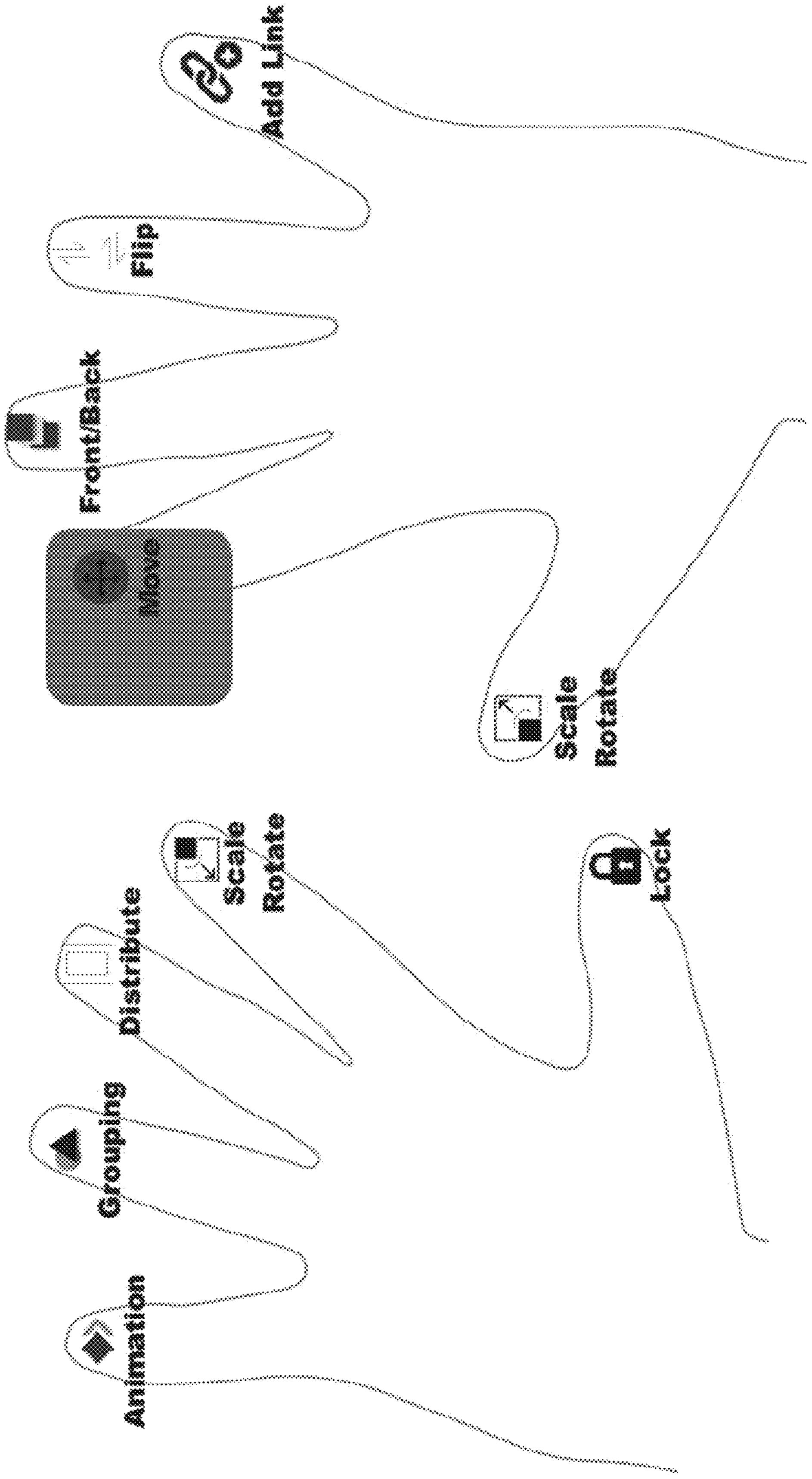
FIG. 6B shows the correspondence between fingers and functions during figure selection according to an embodiment of the present invention.

FIGS. 6A and 6B show examples of figure editing according to an embodiment of the present invention. In this example, triggered by the selection of an object of an action, the set of functions assigned to the fingers is switched. Similar to the temporary mode switching described above, the mode may be controlled so that the mode is temporarily switched only while the touch action is continued and returns to the original mode when the touch action is released, or the mode may be controlled to return only under certain conditions. FIG. 6A shows a state in which no touch action is performed on an object, and FIG. 6B shows a state in which a touch action is performed on an object with the right index finger to select it. The assignment of functions to each finger may be switched so that actions can be performed on that figure only while the touch action is maintained.

Even if the touch action is released, the selection state of the object of an action may be continued. In this case, control may be performed such that the mode is not returned even after the touch action is released. For example, the selection state of an object may be terminated when the touch action is performed again on the object in question or when the touch action is released. Any other action may be used to terminate the selection state. The mode may then be restored in response to the termination of the selection state. Alternatively, if the touch action is released while an object is being selected, a control may be performed to assign a different set of functions to the fingers than before the selection of the object in question. The fact that an object is being selected means that further actions on that object are likely to be performed. Furthermore, when the touch action is released while the object is being selected, control may be performed to assign a different set of functions to the fingers than before and during the touch action of the object in question.

Multiple objects may be selectable, and the function group assigned to each finger may be switched according to the types of multiple objects selected. In this case, the switching of the function group can be performed, for example, at the time when multiple objects are selected, at the time when additional objects are selected while multiple objects are selected, at the time when the selection state of any object ends while multiple objects are selected, or at the time when a touch action is performed on any of the objects in a state in which multiple objects are selected.

In the object selection state, control may be performed such that a touch action on another object with the finger to which the selection function is assigned (e.g., right index finger) results in an additional selection while the touch action of the specific finger (e.g., right thumb) is continued, if necessary. Alternatively, in the state of object selection, while continuing the touch action of a specific finger as necessary, another object may be additionally selected by dragging the finger used to select that object to the area where another object exists. A multiple selection function may be assigned to a finger so that multiple touch actions may be performed with the finger and multiple objects existing within a rectangular, polygonal, circular or elliptical area connecting the points where those touch actions were performed may be selected. In addition, a multiple selection function may be assigned to a finger so that a drag operation may be performed with the finger and multiple objects that exist within the area enclosed by the locus may be selected. The function of the finger to which a selection function is assigned may be switched to a multiple selection function by continued touch action of a specific finger.

Here, a hover action may be used instead of a touch action as a trigger for object selection. In other words, in the example in FIG. 6B, the coordinates of the right index finger can be positioned on the object of an action, or in other words, a temporary mode switch can be performed simply by hovering. If a touch action is then performed with a finger other than the right index finger, the function assigned to that finger may be performed. In determining whether a hover action has been performed, it may be determined that a hover action is in progress when a given finger is below a predetermined height. Typically, this is when the distance between the desk surface and the finger is equal to or below a predetermined value. Alternatively, the hover operation may be determined based on the difference from the height of the other finger, and the hover may be considered to be performed when the finger is at a distance equal to or lower than the predetermined distance from the other finger. In this case, the height of the other finger may be the height of the lowest finger other than the finger performing the hover action, the average of the heights of multiple fingers other than the finger performing the hover action, or the height of a finger adjacent to the finger performing the hover action. By taking the finger height into account in determining the hover action in this way, the problem of frequent screen rewrites due to mode switching can be avoided.

Figure 7:
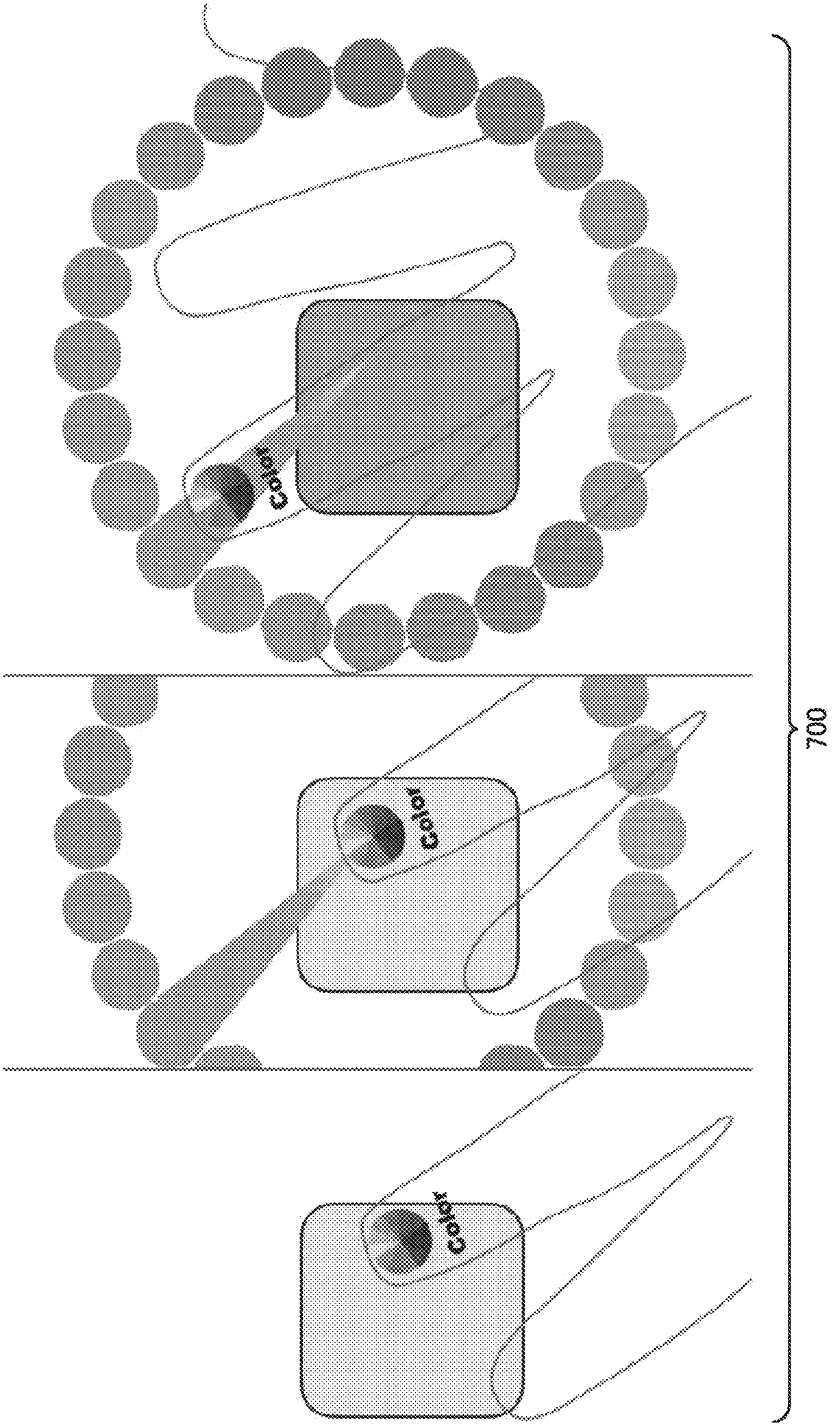
FIG. 7 illustrates the color change of a figure by parameter control according to an embodiment of the present invention.

FIG. 7 shows the flow of color change by parameter control according to an embodiment of the present invention. The illustration is in monochrome, but in reality, each circle arranged in a circular pattern will be displayed in a different color. FIG. 7 shows the flow 700 of controlling parameters by sliding the finger while maintaining the touch action. First, a touch action is performed on the figure with the middle finger of the right hand, to which the color change function is assigned. Then, a color change menu with multiple color choices arranged in a circular pattern appears. The color of the figure can then be changed by selecting one of the color choices while maintaining the touch action with the middle finger of the right hand. When the touch action of the right hand middle finger is released, the function assignment to the finger may be restored. In general, a single finger touch action can control two degrees of freedom, up, down, left, and right. While maintaining the touch action of the first finger by which touch was performed, parameter controls may be assigned to other fingers to allow control of different parameters. Depending on the function, parameters may be controllable with two or more fingers. This theoretically allows a total of 20 degrees of freedom of control with 10 fingers of both hands. Selection of choices from the displayed menu may be made possible by a different finger than the finger that performed the touch action on the figure. In addition to color changes, the parameter control shown in FIG. 7 can also be applied to brushes, fonts, etc., allowing the user to efficiently perform actions such as selecting one of many choices.

Figure 8:
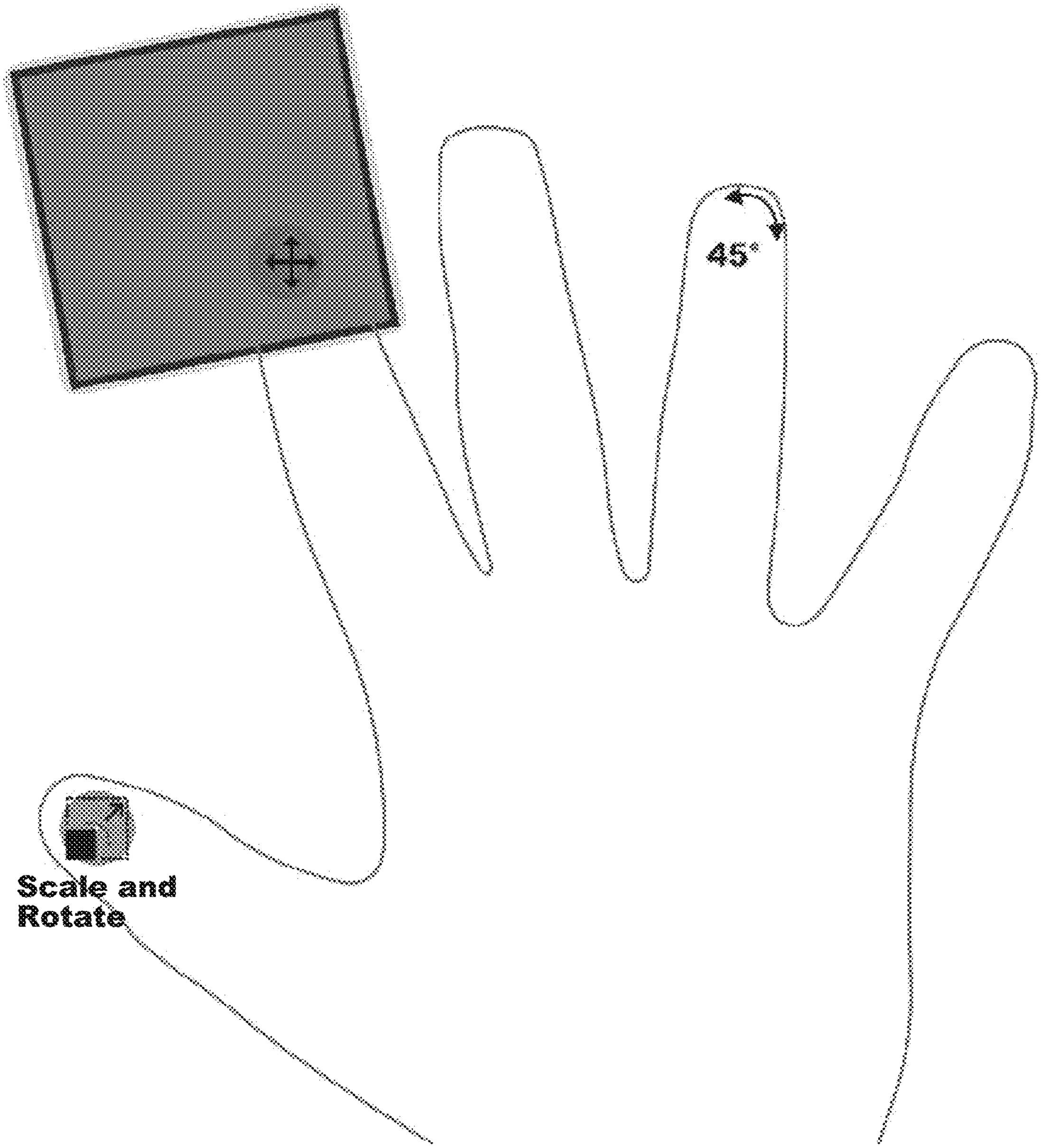
FIG. 8 illustrates the rotation of a figure by parameter control according to an embodiment of the present invention.

FIG. 8 illustrates the rotation of a figure with parameter control according to an embodiment of the present invention. In the example in FIG. 8, the parameter of rotation angle is constrained to 45-degree units in the editing function that rotates the figure. The figure can be selected with the right index finger, to which the object selection function is assigned, and rotated with the right thumb, to which the rotation function and the parameter control function, which uses the rotation angle as a parameter, are assigned. By assigning the parameter constraint function that constrains the rotation angle to 45-degree units to the ring finger of the right hand and performing a touch action with the ring finger, the rotation angle determined by the right hand thumb drag action can be set to 45-degree units. The rotation function assigned to the right hand thumb can be performed at predetermined time intervals while the touch action of the right hand thumb is continued, and the rotation angle can be determined according to the drag action.

More generally, if the parameter control function is assigned to a specific finger, then another finger can be assigned the ability to change the parameter control function, and while the touch action with the that finger continues, at least one of the type of parameter determined by the action of that specific finger, the number of the parameters and the unit of increase or decrease of the value of each parameter can be changed. An example of changing the number of parameters is changing from a two-dimensional angle of rotation to a three-dimensional angle of rotation. Assignment of the change function to another finger may be made at the time of assignment of the parameter control function to a particular finger, or alternatively, in response to the detection of a touch action by a particular finger.

Figure 9:
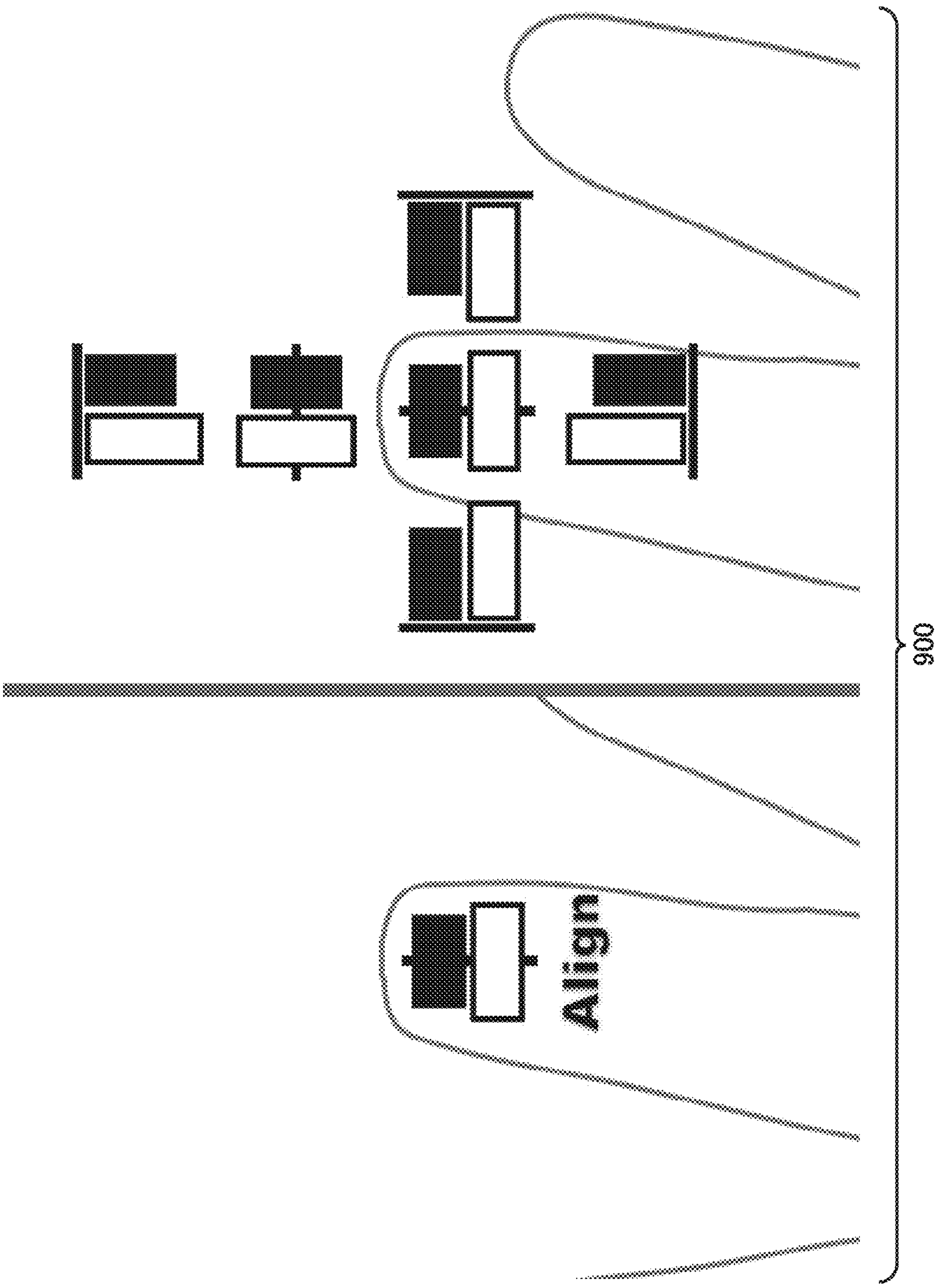
FIG. 9 illustrates the alignment of figures by parameter control according to an embodiment of the present invention.

FIG. 9 shows the alignment of shapes by parameter control according to an embodiment of the present invention. Although many functions can be assigned to a finger by mode switching, the deeper the hierarchy, the more complex it becomes and the longer the function selection time is expected to be. Therefore, the complexity can be avoided by making some groupable multiple functions selectable from a context menu. FIG. 9 is an example of the align command processing, showing a change 900 from the left side where no touch action is performed to the right side where a touch action is performed and a menu is displayed. In this example, if the finger is released, the image is aligned horizontally in the center, and other options such as up, down, left, right, and vertical center can be selected.

In the above description, the command processing is mainly an example of editing objects, but it can be processing to an object other than editing. Examples of such processing include conversion such as translation of selected text, web search based on selected text, storing such as exporting the selected object to a file, copying the selected object, computing based on the selected text, sending the selected object, etc., and any combination of these can also be used. For example, when an object is selected and moved with a specific finger (e.g., the index finger of the right hand), i.e., when an object is selected with a finger to which the selection function is assigned and the function of the movement action is assigned to that finger, moving after touch action with another finger (e.g., the ring finger of the right hand) will instead of the editing processing of simply moving an object, a combined control may be performed so that the object is copied and then moved.

The invention claimed is:

1. A method for providing a user interface to a user, comprising steps of:

identifying a plurality of fingers of the user;

assigning a mode switching function or a mode switching function and an object selection function to a first finger of the identified plurality of fingers; and switching a function assigned to each of a second finger and a third finger of the identified plurality of fingers to a different function in response to a touch action or a hover action by the first finger;

wherein at least one of the second finger and the third finger is different from the first finger;

wherein when the mode switching function is assigned and the object selection function is not assigned to the first finger, returning a function of the second finger or the third finger in response to release of the touch action or the hover action by the first finger within or below a predetermined time.

2. The method according to claim 1, wherein when the mode switching function and the object selection function are assigned to the first finger, a selected state of the object is maintained even after the touch action or the hover action on the object is released.

3. The method according to claim 1, wherein one or more functions assigned to the second finger include at least one of a command processing function, a parameter control function, and an object selection function.

4. The method according to claim 3, wherein one or more functions assigned to the second finger after switching include a parameter control function; and wherein a function assigned to the third finger after switching include a function of changing the parameter control function.

5. The method according to claim 3, wherein one or more functions assigned to the second finger after switching include a parameter control function;

the method further includes assigning a function of changing the parameter control function to a finger different from the first finger and the second finger in response to a touch action or a hover action by the second finger.

6. The method according to claim 3, wherein one or more functions assigned to the second finger after switching include at least one of an editing function, a search function, a saving function, a copying function, a calculation function, a sending function, and any combination thereof.

7. The method according to claim 6, wherein the editing function includes at least one of moving, aligning, rotating, image editing, and adding text.

8. The method according to claim 3, wherein the second finger is the same finger as the first finger.

9. The method according to claim 1, further comprising a step of displaying an icon or a label representing a function assigned to each of the identified fingers on a display used by the user along with a virtual hand representing the identified plurality of fingers.

10. A non-transitory computer readable medium storing a program that when executed causes a computer to perform a method for providing a user interface to a user, the method comprising steps of:

identifying a plurality of fingers of the user;

assigning a mode switching function or a mode switching function and an object selection function to a first finger of the identified plurality of fingers; and switching a function assigned to each of a second finger and a third finger of the identified plurality of fingers to a different function in response to a touch action or a hover action by the first finger;

wherein at least one of the second finger and the third finger is different from the first finger; and wherein when the mode switching function is assigned and the object selection function is not assigned to the first finger, returning a function of the second finger or the third finger in response to release of the touch action or the hover action by the first finger within or below a predetermined time.

11. An apparatus for providing a user interface to a user, configured to:

identify a plurality of fingers of the user;

assign a mode switching function or a mode switching function and an object selection function to a first finger of the identified plurality of fingers; and switch a function assigned to each of a second finger and a third finger of the identified plurality of fingers to a different function in response to a touch action or a hover action by the first finger;

wherein at least one of the second finger and the third finger is different from the first finger; and wherein when the mode switching function is assigned and the object selection function is not assigned to the first finger, a function of the second finger or the third finger is returned in response to release of the touch action or the hover action by the first finger within or below a predetermined time.

12. The method according to claim 2, wherein one or more functions assigned to the second finger include at least one of a command processing function, a parameter control function, and an object selection function.

* * * * *